US008827110B2

(12) United States Patent
Franzone, Jr. et al.

(10) Patent No.: US 8,827,110 B2
(45) Date of Patent: Sep. 9, 2014

(54) TWO-PART HANDLE SYSTEM FOR HORTICULTURAL TRAY

(75) Inventors: Andrew Franzone, Jr., West Islip, NY (US); John Sperling, Massapequa, NY (US)

(73) Assignee: Texpak, Inc., Franklin Square, NY (US)

( * ) Notice: Subject to any disclaimer, the term of this patent is extended or adjusted under 35 U.S.C. 154(b) by 0 days.

(21) Appl. No.: 13/453,120

(22) Filed: Apr. 23, 2012

(65) Prior Publication Data

US 2013/0277381 A1   Oct. 24, 2013

(51) Int. Cl.
| | |
|---|---|
| *B65D 25/00* | (2006.01) |
| *B65B 5/06* | (2006.01) |
| *B65D 25/28* | (2006.01) |
| *F16B 1/00* | (2006.01) |
| *F16B 21/08* | (2006.01) |
| *F16B 45/00* | (2006.01) |

(52) U.S. Cl.
CPC ............... *B65D 25/28* (2013.01); *B65B 5/068* (2013.01); *F16B 21/086* (2013.01); *F16B 1/00* (2013.01); *F16B 45/00* (2013.01)
USPC ........... 220/754; 220/760; 220/770; 220/755; 220/759; 220/769; 24/690; 24/289; 24/295; 24/293; 24/294

(58) Field of Classification Search
CPC .... B65D 25/28; B65D 25/2867; B65D 25/32; B65D 5/068; A01G 9/104; F16B 1/00; F16B 45/00; F16B 21/086
USPC ......... 220/754, 760, 770, 755, 759, 768–769, 220/773, 775, 776, 567.2; 128/207.11; 24/690, 289, 295, 293, 294, 297, 24/581.1, 458; 52/716.2, 716.5, 716.7, 52/716.8, 717.04–717.06; 206/822, 162, 206/164, 423; 40/667, 660, 661.03, 661, 5, 40/661.08; D8/306; 16/425, 422, 430, 16/110.1, 406; 190/115; 47/87, 66.5, 85
See application file for complete search history.

(56) References Cited

U.S. PATENT DOCUMENTS

| | | | | |
|---|---|---|---|---|
| 3,608,814 | A | * | 9/1971 | Lautin ...................... 229/117.24 |
| 3,944,033 | A | * | 3/1976 | Simson .......................... 190/117 |
| 4,938,731 | A | * | 7/1990 | Nguyen et al. ................ 464/158 |
| 5,046,223 | A | * | 9/1991 | Kraus .............................. 24/453 |
| 5,173,026 | A | * | 12/1992 | Cordola et al. ............... 411/508 |
| 5,695,234 | A | * | 12/1997 | Coticchio et al. ............. 294/152 |
| 6,085,933 | A | * | 7/2000 | Brunazzo ...................... 220/760 |
| 6,381,811 | B2 | * | 5/2002 | Smith et al. ..................... 24/289 |
| 6,385,903 | B1 | * | 5/2002 | Diller et al. .................... 47/66.5 |
| 6,611,965 | B1 | * | 9/2003 | Lee .................................. 2/431 |
| 6,695,269 | B1 | * | 2/2004 | Anscher ................... 248/225.11 |
| 7,338,068 | B2 | * | 3/2008 | Kawai et al. ............... 280/728.2 |

* cited by examiner

*Primary Examiner* — Anthony Stashick
*Assistant Examiner* — James M Van Buskirk
(74) *Attorney, Agent, or Firm* — Epstein Drangel LLP; Robert L. Epstein

(57) ABSTRACT

The handle end portions are attached to the tray by separate connectors. The tray has spaced openings to receive the connectors. Each connector has an anchor-shaped section which is received in a tray opening and a section which engages a handle end portion. The anchor-shaped section has arms which flex to permit the connector to be received in the tray opening and thereafter return to their extended position to cooperate with the tray to securely attach the connector to the tray and prevent free rotation of the connector. The handle engaging section includes a hook-shaped member which is received an opening in the handle end portion.

21 Claims, 5 Drawing Sheets

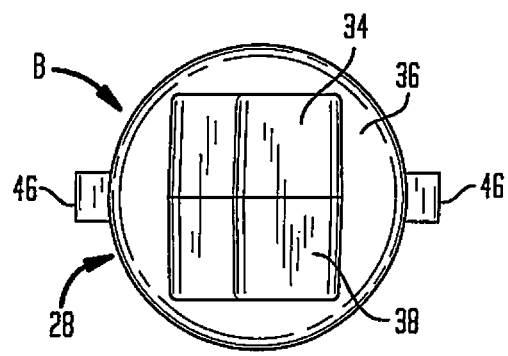
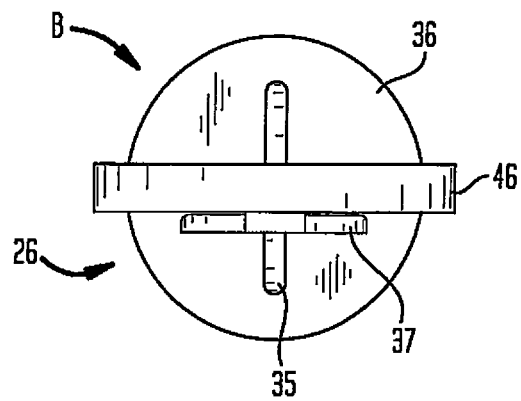

TWO-PART HANDLE SYSTEM FOR HORTICULTURAL TRAY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to multi-cell trays for packaging, transporting and displaying groups of horticultural products such as flowers, herbs and other plants, and more particularly to a handle system for such horticultural trays which utilizes separate connectors to facilitate mounting of the handle to the tray in a highly secure manner.

2. Description of Prior Art Including Information Disclosed Under 37 CFR 1.97 and 1.98

Multi-cell plastic trays for use in packaging, transporting and displaying groups of plants, such a flowers and herbs, are well known in the art. Because it is desirable that the trays be able to be held and carried easily, and in particular that the trays be able to be picked up and moved by a person using only one hand, a variety of different flexible plastic handles have been developed for use with the trays.

The handles consist of an elongated body made of flexible plastic and are commonly formed by die stamping the desired shape from a sheet of thin plastic. The handles are provided with portions at each end which have outwardly extending protrusions on each side. In order to mount the handles to the tray, the end portions of the handle are inserted into and directly engage spaced openings formed in the tray for that purpose.

Although such conventional handles are inexpensive to produce, they suffer from a variety of drawbacks. They are easy to mount to the tray by flexing the end portions and inserting them into the tray openings but the handles do not remain securely engaged in the tray openings. That is because, if the handle end portions are made to be very flexible for easy insertion into the tray openings, they tend to accidently dislodge from the tray openings when the tray is picked up by the handle, particularly when the tray is heavily weighted with soil and plants. On the other hand, if the end portions of the handle are made less flexible, so as to more securely engage the tray, it becomes more difficult and time consuming to properly insert the end portions into the tray openings in the proper position.

The conventional handles are particularly difficult to mount to the tray at certain times during the growing cycle of the plants. Due to high transportation costs, empty trays are transported in multi-unit stacks from the manufacturer to the location where the plants seedlings are inserted into the soil in the tray cells to grow. In order not to interfere with the tray stacking operation, the handles are sold separately from the trays.

After the trays are separated from the stack, soil is placed in the cells and the seedlings are planted in the soil in the cells. The handles may be attached to the trays by the growers, after the plants mature, before the plant containing trays are shipped to the retailers for sale. If the handles are not supplied by the growers, the retailers themselves may attach the handles to the trays at their locations, prior to the sale of the trays.

Because the openings in the tray into which the handle end portions are received are located in the plane of the top surface of the tray, once the plants grow above that plane, the openings may become partially or completely obscured by the plants. It is then often difficult for the person mounting the handles to locate the openings in order to insert the end portions of the handles. The result is that the handle mounting process is more time consuming and the plants may be damaged during the handle mounting process.

In order to secure conventional handles to the trays, the handles must be formed with end portions with outwardly extending protrusions which are wider than the diameter of the tray openings, so they can engage the tray openings. As a result, the end portions must be flexed to fit into the tray openings. Once in the opening, the end portions return to a near planar condition, such that protrusions on the sides of the end portions engage opposite points on the edge of the tray opening to retain the end portions within the tray opening. Once the handle end portions are received within the tray openings, to properly seat the end portions, the operator often has to pull slightly on the handle in order to obtain the desired position. Otherwise, the handle may dislodge when the tray is picked up. Accordingly, the mounting procedure is labor intensive and requires substantial time to complete successfully.

Because of the construction of plant trays formed to receive conventional handles, the end portions of the handles can freely rotate within the openings in the tray. As a result, once mounted, the handle is not fixed in the upright position and the handle may move to a position in which it cannot be easily grabbed.

With conventional handles, it is virtually impossible to carry more than one tray in each hand and thus an individual can carry two trays at most. If one does try to carry more than one tray in a single hand, the trays must be held at an awkward angle and the end portions of the handle may dislodge because of the extra force applied to them. This becomes a particularly troublesome problem at retail when a consumer wishes to purchase more than two trays. Because the consumer can only carry two trays at a time, often the consumer will buy only two, limiting the number of trays that are sold.

For a handle to operate effectively, it is important that it stand upright after it is mounted on the tray so that it is easy to grab. However, that is often not the case with conventional handles because of the size and the position of the openings in the tray.

With conventional handles, there is no structure to keep the handle end portions centered within the tray openings. Movement of an end portion from a position at the center of a tray opening may result in accidental detachment of the handle from the tray. That is because, as one side of the end portion moves from the center toward one point on the edge of the opening, the opposite side of the end portion moves away from the other side of the edge. That allows the opposite side of the end portion to disengage from the edge and the end portion to pull out of the tray opening.

The above noted disadvantages of conventional plastic handles are overcome by the present invention which includes a two-part handle system for a multi-cell horticultural tray consisting of a flexible handle and a connector including a section with a hook-shaped member adapted to engage the end portion of the handle and a section with an anchor-shaped member adapted to be easily received in and engage an opening in the tray in a highly secure manner.

It is, therefore, a prime object of the present invention to provide a two-part handle system for a horticultural tray in which the handle is easily and securely mounted to the tray by means of a separate connector.

It is another object of the present invention to provide a two-part handle system for a horticultural tray in which the handle cannot easily be accidentally dislodged from the tray without damaging either the handle or the tray.

It is another object of the present invention to provide a two-part handle system for a horticultural tray in which the end portion of the handle is mounted to the tray using a separate connector which has a section adapted to engage an end portion of the handle and a section adapted to be received within an opening in the tray.

It is another object of the present invention to provide a two-part handle system for a horticultural tray in which the connector can be inserted into the tray opening either when the tray is empty or are filled with soil, but before the plants have germinated, and the handle is attached to the connector after the plants have grown.

It is another object of the present invention to provide a two-part handle system for a horticultural tray in which the process of inserting the connectors into the tray openings can be automated.

It is another object of the present invention to provide a two-part handle system for a horticultural tray in which a flexible anchor-shaped member of the connector retains the connector securely within the tray opening.

It is another object of the present invention to provide a two-part handle system for a horticultural tray in which the connectors cannot freely rotate within the tray openings.

It is another object of the present invention to provide a two-part handle system for a horticultural tray in which the hook-shaped member of the connector prevents the handle end portion from disengaging from the connector.

It is another object of the present invention to provide a two-part handle system for a horticultural tray in which it is easy for an individual to carry more than one tray at a time in one hand without fear that the handles will dislodge from the trays.

It is another object of the present invention to provide a two-part handle system for a horticultural tray in which the connector causes the handle to stand upright after attachment to the tray in order to facilitate grabbing the handle.

It is another object of the present invention to provide a two-part handle system for a horticultural tray in which the structure of the connector automatically acts to center the connector in the tray opening and retains the connector in the centered position to avoid accidental dislodgement.

BRIEF SUMMARY OF THE INVENTION

The above noted objects are achieve by the present invention which includes a two-part handle system for a horticultural tray of the type having a plurality of cells adapted to receive plants. The tray includes an opening. A flexible handle is provided having an end portion. A separate connector is adapted to attach the handle end portion to the tray. The connector has a section adapted to be received in the tray opening and a section adapted to engage the handle end portion.

The tray has a wall which partially defines one of the cells. The tray opening may be situated within a protrusion which extends beyond the top surface of the cell wall or may be located in the top surface of the cell wall itself . . . .

The handle end portion has an opening spaced from the edge of the handle end portion. The handle engaging section of the connector is adapted to be received in the handle end portion opening. The handle engaging section of the connector has a hook-shaped configuration.

The tray engaging section of the connector includes a part extending axially away from the handle engaging section and a flexible part extending radially outwardly from the axial part. The flexible part extends from the axial part at an acute angle. Preferably, two oppositely directed flexible parts extend radially from the axial part, such that the tray engaging section of the connector has a substantially anchor-shaped configuration.

The tray opening is defined by a surface with an edge. The flexible part cooperates with the edge as the connector is inserted into the tray opening to cause the flexible part to move radially inwardly to a flexed position, permitting the tray engaging section of the connector to be received in the opening. Thereafter, the flexible part returns to its extended position under the opening defining surface to prevent the connector from being dislodged from the opening.

The connector has means for preventing the connector from freely rotating relative to the tray opening. The rotation preventing means includes the flexible part of the connector which cooperates with the portion of the tray adjacent the opening.

The handle engaging section of the connector cooperates with the opening hi the handle end portion to maintain the handle in a desired position relative to the tray. The desired position may be upright or at an angle relative to the top surface of the tray.

The tray engaging section of the connector has a cross-shaped structure which is slightly smaller than the diameter of the tray opening to retain the connector in a position at the center of the opening.

In accordance with another aspect of the present invention, a handle is provided for a horticultural tray of the type having a plurality of cells adapted to receive plants. The handle has a flexible body with an end portion with an edge. The handle end portion has an opening spaced from the edge.

The handle end portion is adapted to be engaged by a hook-shaped member having a given size and shape. The handle end portion opening is adapted to receive the hook-shaped member. The hook-shaped member cooperates with handle end portion opening to maintain the handle in the desired position on the tray. Preferably, the opening has a rectangular shape and the handle is maintained in an upright position.

In accordance with another aspect of the present invention, a connector is provided for attaching a handle to a horticultural tray of the type having a plurality of cells adapted to receive plants. The connector includes a section adapted to engage an end portion of the handle and a section adapted to engage the tray.

The tray engaging section of the connector includes a first part extending in a direction away from the handle engaging section and a flexible part extending outwardly from the first part.

The flexible part extends from the first part at an acute angle. Preferably, the section of the connector adapted to engage the tray has two outwardly extending flexible parts giving it an anchor-shaped configuration.

The tray has an opening at least in part defined by a surface with an edge. The flexible part cooperates with the edge to cause the flexible part to move to a flexed position, permitting the tray engaging section of the connector to be received in the opening. Thereafter, the flexible part returns to a position wherein it cooperates with the surface to prevent the connector from being removed from the opening.

The flexible part of the connector cooperates with the tray to prevent the free rotation of the connector relative to the tray, when the connector is received in the tray opening.

In accordance with another aspect of the present invention, a method of attaching a handle to a horticultural tray using a connector is provided. The tray is of the type having a plurality of cells adapted to receive plants. The tray also has an opening therein. The method comprises the steps of: (a) inserting the connector into the opening in the tray; (b) inserting plants into the tray cells; and (c) engaging the end portion of the handle and the connector.

The connector may be inserted into the tray opening either before or after the plants are inserted into the tray cells.

The connector is engaged by the handle end portion after the plants are inserted into the tray cells, and preferably after the plants have grown.

In accordance with another aspect of the present invention, a method of attaching a handle to a horticultural tray using a connector is provided. The handle has an end portion with an opening spaced from the edge thereof. The tray is of the type having a plurality of cells adapted to receive plants. The connector has a hook-shaped member and a section adapted to engage the tray. The method includes the steps of: (a) mounting the connector to the tray with the hook-shaped member extending above the tray; (b) placing the handle end portion over the hook-shaped member such that the hook-shaped member extends through the opening in the handle end portion; and (c) moving the handle end portion away from the tray such that the handle end portion is engaged by the hook-shaped member.

Preferably, the handle end portion is attached to the connector after the plants are received in the cells of the tray, and most preferably, after the plants received in the cells grow.

BRIEF DESCRIPTION OF THE SEVERAL VIEWS OF DRAWINGS

To these and to such other objects that may hereinafter appear, the present invention relates to a horticultural tray with two-part handle system as described in detail in the following specification and recited in the annexed claims, taken together with the accompanying drawings, in which like numerals refer to like parts and in which:

FIG. 6 is a top elevation view of the connector of FIG. 4; and

FIG. 7 is a top elevation view of the connector of FIG. 4.

DETAILED DESCRIPTION OF THE INVENTION

Figure 1:
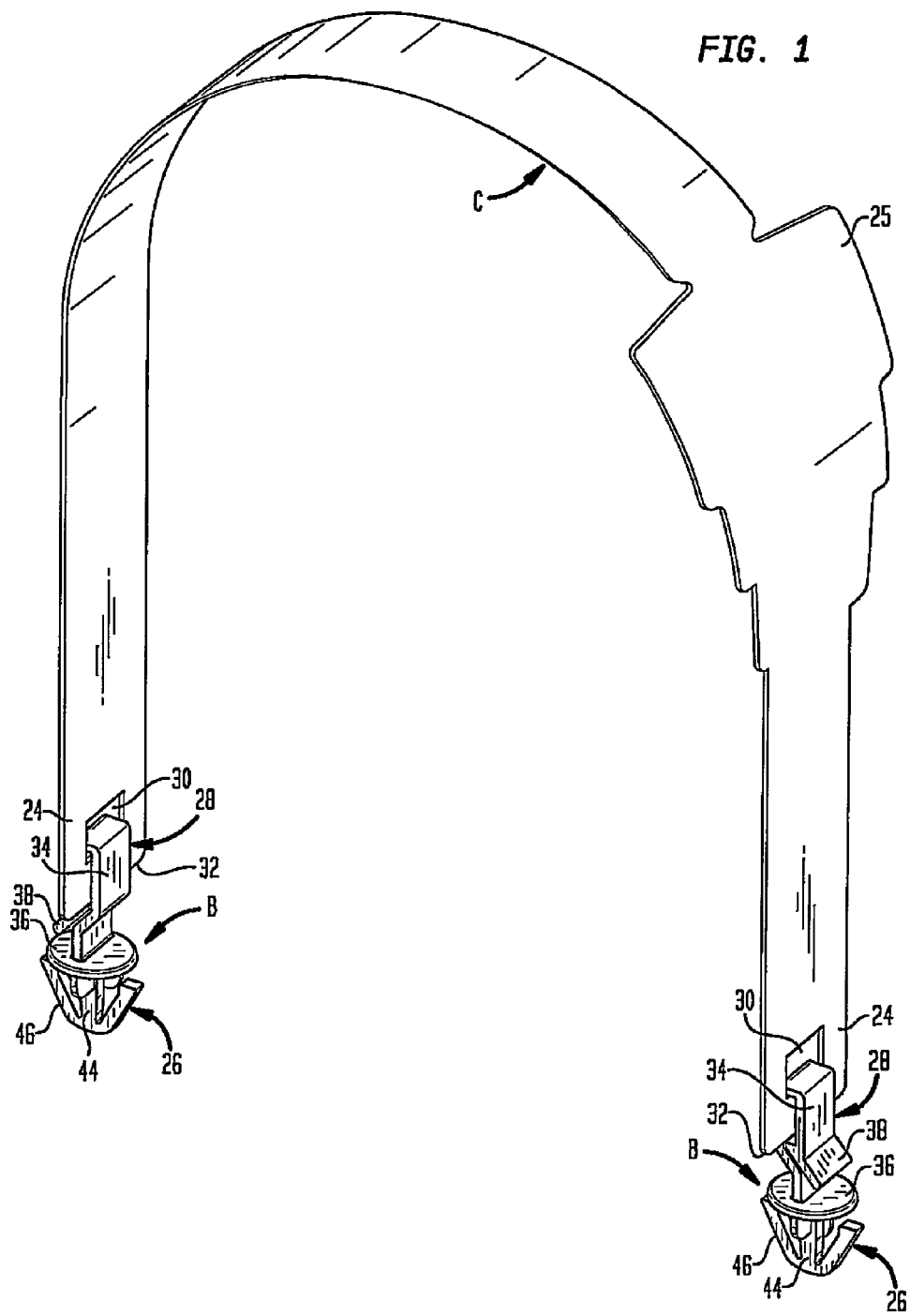
FIG. 1 is a perspective view of the two-part handle system of the present invention showing the handle with the connectors engaged to the end portions thereof.
Figure 2:
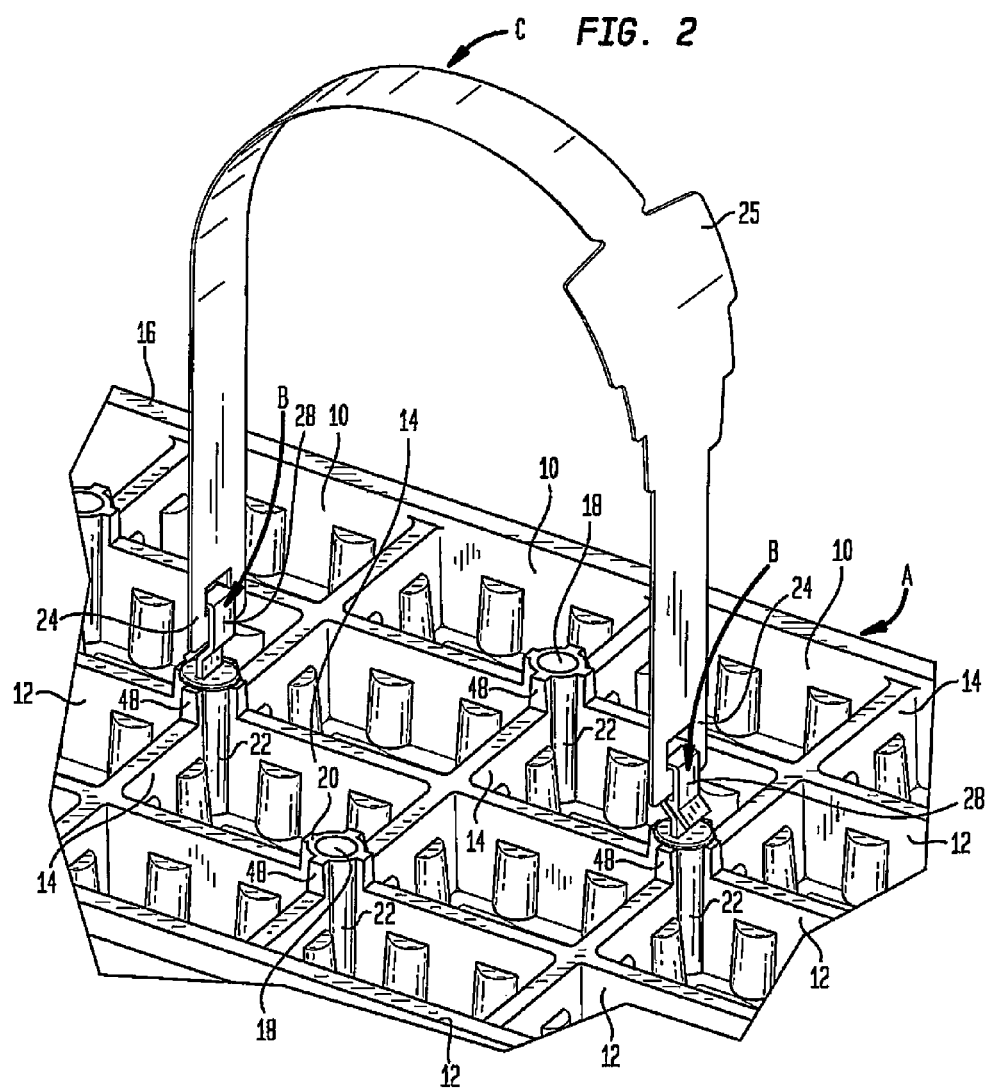
FIG. 2 is a perspective view of a portion of the horticultural tray with the two-part handle system of the present invention attached thereto.
Figure 3:
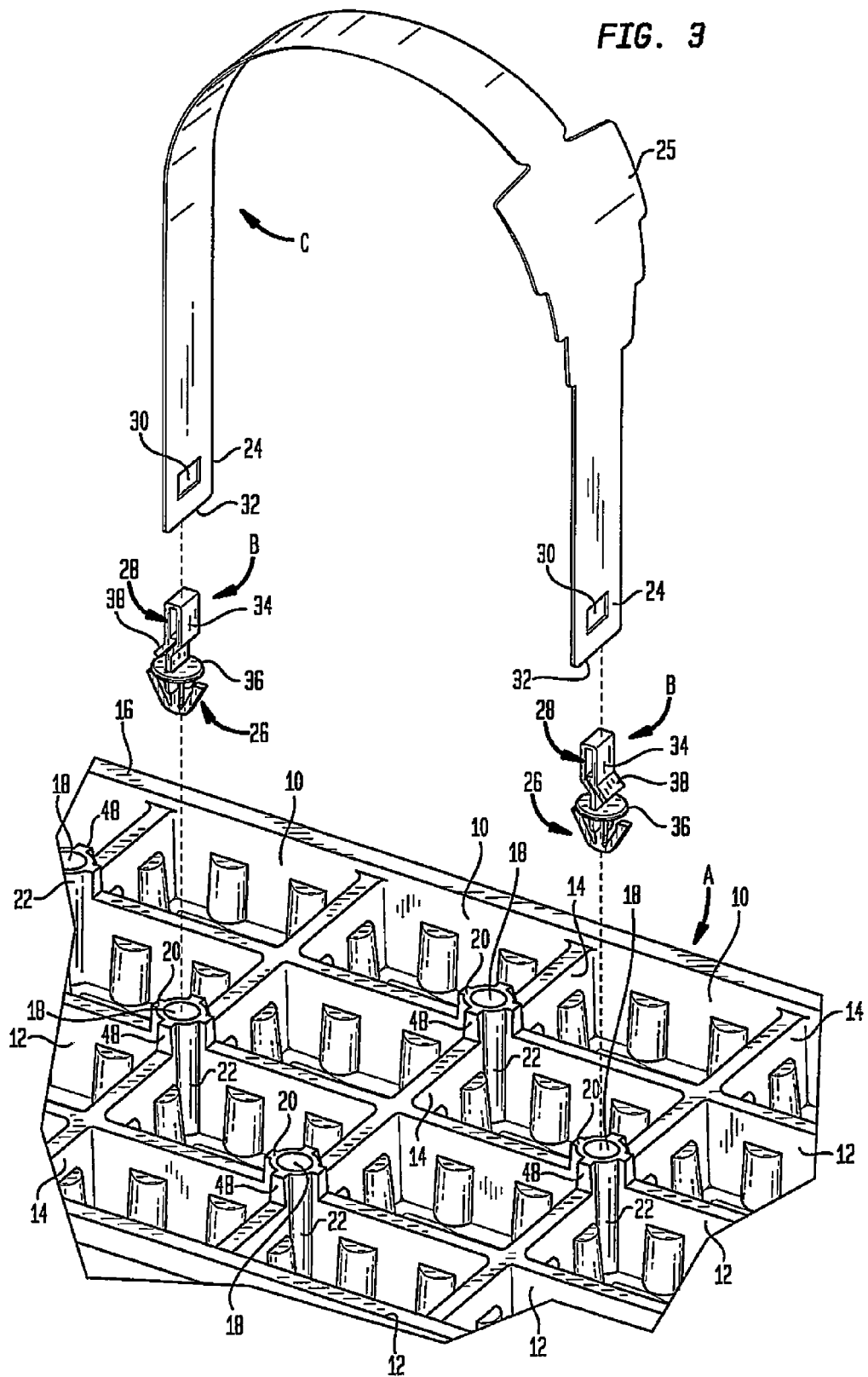
FIG. 3 is an exploded perspective view of the handle, connector and tray portion of FIG. 2.

FIG. 1 illustrates the two-part handle system of the present invention. FIGS. 2 and 3 respectively illustrate the two-part handle system of the present invention before and after the two-part handle system is mounted to the horticultural tray.

As seen in FIGS. 1, 2 and 3, the horticultural tray, generally designated A, is adapted to receive the two-part handle system which consists of connectors, generally designated B, and a handle, generally designated C. Handle C is mounted to tray A by two connectors B, one at each end portion of the handle.

The tray has a plurality of cells 10. Each cell 10 is adapted to receive soil (not shown) into which one or more plant seedlings will be inserted and within which the seedlings will grow. The cells of the tray are defined by orthogonal walls 12, 14 extending between the side walls 16 of the tray.

The tray is provided with a plurality of openings 18, each adapted to receive a connector B. Each tray opening 18 is formed in the top surface 20 of the tray walls 12, 14, which may include a generally cylindrically shaped protrusion 22 formed at selected intersections of the cell walls 12, 14. Protrusions 22 extend above the top surface of the cell walls 12, 14 and thus above the plane of the tray as defined by the cell walls, as illustrated in the figures.

Handle C is made of flexible plastic. Handle C has a portion 24 at each end. Each end portion 24 of the handle is adapted to be engaged by a different connector B to mount the handle on the tray. Preferably, handle C is provided with an enlarged portion 25 for receiving a label or imprint with the name or logo of the supplier or seller of the product.

As best seen in FIGS. 4, 5, 6 and 7, each connector B includes a lower section 26 adapted to be received in the tray opening 18 and an upper section 28 adapted to engage the handle end portion 24

Each of the handle end portions 24 has an opening 30 spaced from the peripheral edge 32 of the handle end portion. The handle engaging section 28 of connector B is adapted to be received in the handle end portion opening 30. The handle engaging section 28 of the connector includes a hook-shaped member 34.

The tray engaging section 26 of connector B is separated from the handle engaging portion 28 by a circular member 36. Member 36 has a diameter which is slightly larger than the diameter of opening 18 of the tray, such that circular member 36 can rest on the top surface 20 of the tray wall but cannot pass through opening 18.

Figure 4:
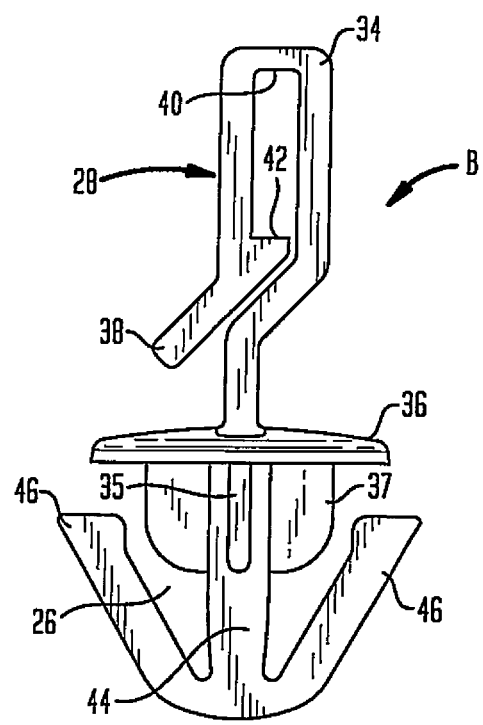
FIG. 4 is a side elevation view of the connector of the present invention.
Figure 5:
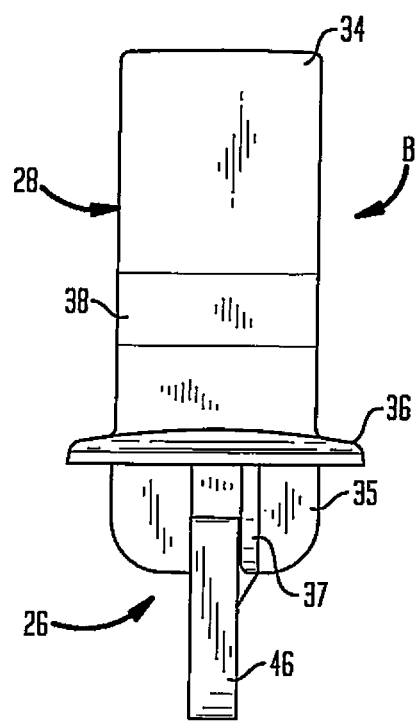
FIG. 5 is a front elevation view of the connector of FIG. 4.

As is best seen in FIG. 4, member 34 includes an elongated element 38 which is mounted on the free end of the hook structure at an acute angle relative to circular member 36. The entire handle engaging section 28 of the connector has a width that is slightly smaller than the width of the opening 30 in the handle end portion 24. This allows element 38 and member 34 to be received in the opening 30 of the handle end portion.

Once member 34 is received in opening 30, the handle is moved in a direction away from circular member 36 until the lower edge of opening 30 of the handle end portion lodges under the interior surface 40 of the top portion of member 34. At that point, the section of the handle end portion between the lower edge of opening 30 and the peripheral edge 32 of the handle end member extends between the interior surface 40 of member 34 and the back end 42 of element 38. In this way, the handle is securely attached to the connector.

The rectangular shape and width of connector member 34 and the rectangular shape and width of opening 30 in the handle end portion cooperate to prevent the handle from rotating relative to the connector and retain handle C in the desired position relative to tray A. The desired position may be upright relative to the tray surface. However, by altering the shape of opening 30, other relative positions of the handle may be achieved.

When protrusions 22 are present in the tray, the protrusions will extend above the plane of the cell walls. With that configuration, access to hook-shaped member 34, in order to attach the handle to the connector, is not blocked by the plants as they grow in the cells.

The tray engaging section 26 of the connector includes a central part 44 extending downwardly away from circular member 36 along the axis of the connector and oppositely directed flexible arms 46 extending radially outwardly from central part 44 at an acute angle. Thus, part 44 and arms 46 form a substantially anchor-shaped member.

The flexible arms 46 of section 26 cooperate with the edge of tray surface 20 defining the tray opening 18 to cause the flexible arms 46 to move radially inwardly to a flexed position, permitting the tray engaging section 26 of the connector to pass through opening 18. Thereafter, the flexible arms 46 move radially outwardly to return to their extended position under surface 20 of the tray. That prevents the connector from being pulled out of the tray opening without damaging the connector or the tray. With this structure, the anchor-shaped member of connector B can be easily inserted into the tray opening but is retained in the tray opening in a highly secure manner. Flexible arms 46 also cooperate with the tray opening to prevent the connector from freely rotating relative to the tray.

As best seen in FIG. 7, the tray engaging section 26 of the connector has a cross-shaped structure formed of orthogonal elements 35, 37, each having a slightly smaller size than the diameter of the tray opening 18. Elements 35, 37 function to retain the connector in a position at the center of the tray opening because the elements lodge within the tray opening tray.

Each handle C is attached to tray A using two connectors B. After selecting two openings 18 in the tray which are spaced apart an appropriate distance, based on the length of the handle, lower sections 26 of the connectors are inserted into the openings. Soil can be placed in the cells 10 of the tray, and seedlings planted in the soil in the tray cells, before or after the connectors are mounted. The handle is manipulated such that each of the handle end portions engages the exposed upper section 28 of a different one of the connectors to attach the handle to the tray. Preferably, the handle is attached to the connectors after the seedlings of the plants have grown.

As described above, the handle has an end portion 24 with an opening 30 spaced from the edge 32 thereof. The connector has a hook-shaped member 34 forming the handle engaging portion 28 of the connector and an anchor-shaped section 26 adapted to engage the tray opening. The connector is mounted on the tray with the hook-shaped member 34 extending above the tray. The handle is manipulated such that the handle end portion is placed over the hook-shaped member and the hook-shaped member extends through the opening 30 in the handle end portion 24. The handle is then moved away from the tray such that the handle end portion is securely engaged by the hook-like member. The connector may be mounted on the tray before or after the soil and seedlings are received in the cells of the tray. However, the handle end portion is preferably attached to the connector after the seedlings grow.

It will now be appreciated that the present invention includes a horticultural tray having a plurality of cells adapted to receive plants. The tray includes an opening. A flexible handle is provided having an end portion. A separate connector is adapted to attach the handle end portion to the tray. The connector has an anchor-shaped section adapted to be easily received in the tray opening in a highly secure manner while preventing free rotation of the connector relative to the tray. The connector also has a hook-shaped section adapted to engage the handle end portion.

When the connector is mounted on the tray, the hook-shaped section of the connector is exposed. This permits the handle to engage the connector after the plant seedlings have germinated The tray engaging section of the connector includes a part extending axially away from the handle engaging section and flexible parts oppositely radially extending outwardly from the axial part. The flexible parts extend from the axial part at an acute angle, such that the tray engaging section of the connector has a substantially anchor-shaped configuration.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

We claim:

1. A connector for use in mounting a handle having an end with an opening to a horticultural tray having a plurality of cells adapted to receive plants and a surface with an opening, said connector comprising a body comprising a first section adapted to engage the handle end and a second section adapted to be received in the tray surface opening to engage the tray, a stop member extending outwardly from said body at a point between said first and second sections at least a portion of which stop member is adapted to cooperate with the tray surface when said second section is received in the tray surface opening to prevent said first section from passing through the tray surface opening, said first section comprising a hook member, said hook member comprising a first part extending from said stop member and a second part having an unattached end, said unattached end of said second part of said hook member being inclined relative to said stop member and spaced from a substantially parallel portion of said first part of said hook member so as to define a channel through which the handle end may pass such that the hook member engages the end of the handle, said second section comprising a central part extending from said stop member in a direction opposite to said hook member and flexible arms extending outwardly from said central part, said arms being adapted to flex inwardly to allow said second section to pass through the tray surface opening and thereafter lodge under the tray surface to engage the tray.

2. The connector of claim 1 wherein said second part of said hook member and a second portion of said first part of said hook member are substantially parallel.

3. The connector of claim 1 wherein said flexible arms cooperate with the tray surface to prevent the connector from rotating relative to the tray when said second section is received in the tray surface opening.

4. The connector of claim 1 further comprising elements extending outwardly from said central part which cooperate with said tray to retain said second section in a position proximate the center of the tray surface opening.

5. The connector of claim 4 wherein said elements comprise a set of oppositely extending elements.

6. The connector of claim 4 wherein said elements comprise two sets of oppositely extending elements.

7. The connector of claim 6 wherein said sets of oppositely extending elements are situated in substantially orthogonal planes.

8. In combination, a handle having an end with an opening and a connector for use in mounting said handle to a horticultural tray; said horticultural tray comprising a plurality of cells adapted to receive plants and a surface with an opening, said connector comprising a body comprising a first section adapted to engage the handle end and a second section adapted to be received in the tray surface opening to engage the tray, a stop member extending outwardly from said body at a point between said first and second sections at least a portion of which stop member is adapted to cooperate with the tray surface when said second section is received in the tray surface opening to prevent said first section from passing through the tray surface opening, said first section comprising a hook member, said hook member comprising a first part extending from said stop member and a second part having an unattached end, said unattached end of said second part of said hook member being inclined relative to said stop member and spaced from a substantially parallel portion of said first part of said hook member so as to define a channel through which the handle end may pass such that the hook member engages the end of the handle, said second section comprising a central part extending from said stop member in a direction opposite to said hook member and flexible arms extending outwardly from said central part, said arms being adapted to flex inwardly to allow said second section to pass through the tray surface opening and thereafter lodge under the tray surface to engage the tray.

9. The combination of claim 8 wherein said second part of said hook member and a second portion of said first part of said hook member are substantially parallel.

10. The combination of claim 8 wherein said flexible arms cooperate with the tray surface to prevent the connector from rotating relative to the tray when said second section is received in the tray surface opening.

11. The combination of claim 8 further comprising elements extending outwardly from said central part which cooperate with said tray to retain said second section in a position proximate the center of the tray surface opening.

12. The combination of claim 11 wherein said elements comprise a set of oppositely extending elements.

13. The combination of claim 12 wherein said elements comprise two sets of oppositely extending elements.

14. The combination of claim 13 wherein said sets of oppositely extending elements are situated in substantially orthogonal planes.

15. In combination, a horticultural tray having a plurality of cells adapted to receive plants and a surface with an opening, a handle having an end with an opening and a connector for use in mounting the handle to the tray, said connector comprising a body comprising a first section adapted to engage the handle end and a second section adapted to be received in the tray surface opening to engage the tray, a stop member extending outwardly from said body at a point between said first and second sections at least a portion of which stop member is adapted to cooperate with the tray surface when said second section is received in the tray surface opening to prevent said first section from passing through the tray surface opening, said first section comprising a hook member, said hook member comprising a first part extending from said stop member and a second part having an unattached end, said unattached end of said second part of said hook member being inclined relative to said stop member and spaced from a substantially parallel portion of said first part of said hook member so as to define a channel through which the handle end may pass such that the hook member engages the end of the handle, said second section comprising a central part extending from said stop member in a direction opposite to said hook member and flexible arms extending outwardly from said central part, said arms being adapted to flex inwardly to allow said second section to pass through the tray surface opening and thereafter lodge under the tray surface to engage the tray.

16. The combination of claim 15 wherein said second part of said hook member and a second portion of said first part of said hook member are substantially parallel.

17. The combination of claim 15 wherein said flexible arms cooperate with the tray surface to prevent the connector from rotating relative to the tray when said second section is received in the tray surface opening.

18. The combination of claim 15 further comprising elements extending outwardly from said central part which cooperate with said tray to retain said second section in a position proximate the center of the tray surface opening.

19. The combination of claim 18 wherein said elements comprise a set of oppositely extending elements.

20. The combination of claim 18 wherein said elements comprise two sets of oppositely extending elements.

21. The combination of claim 20 wherein said sets of oppositely extending elements are situated in substantially orthogonal planes.

* * * * *